(12) United States Patent
Walthers et al.

(10) Patent No.: US 10,354,257 B2
(45) Date of Patent: *Jul. 16, 2019

(54) IDENTIFYING CLUSTERS FOR SERVICE MANAGEMENT OPERATIONS

(71) Applicant: ServiceNow, Inc., Santa Clara, CA (US)

(72) Inventors: Bruce Walthers, San Jose, CA (US); Abhay Kulkarni, Santa Clara, CA (US); Mukund Ramachandran, Mountain View, CA (US); Darius Koohmarey, Poway, CA (US)

(73) Assignee: SERVICENOW, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/939,602

(22) Filed: Mar. 29, 2018

(65) Prior Publication Data

US 2018/0322509 A1    Nov. 8, 2018

Related U.S. Application Data

(63) Continuation of application No. 15/723,731, filed on Oct. 3, 2017.

(Continued)

(51) Int. Cl.
*G06F 17/27* (2006.01)
*G06Q 30/00* (2012.01)
(Continued)

(52) U.S. Cl.
CPC ..... *G06Q 30/016* (2013.01); *G06F 16/24578* (2019.01); *G06F 16/285* (2019.01); *G06F 17/2705* (2013.01); *G06F 17/2765* (2013.01)

(58) Field of Classification Search
USPC ........................................................ 704/7–10
See application file for complete search history.

(56) References Cited

U.S. PATENT DOCUMENTS 9,104,753 B2   8/2015 Stuempfle et al.
9,317,829 B2   4/2016 Anand et al.
(Continued)

FOREIGN PATENT DOCUMENTS

WO    03003166 A2   1/2003
WO    2016126415 A1 8/2016

OTHER PUBLICATIONS

Extended European Search Report for European Patent Application No. 18170393.5 dated Aug. 30, 2018; 9 pgs.

*Primary Examiner* — Leonard Saint Cyr
(74) *Attorney, Agent, or Firm* — Fletcher Yoder PC

(57) ABSTRACT

Client instance data including a plurality of incidents is obtained, each incident including a plurality of fields. A target field and an evaluation field are selected from among the plural fields. The plurality of incidents are grouped into a plurality of clusters based on a degree of a natural language text similarity of respective target fields in the plurality of incidents. A quality value is determined for each of the plurality of clusters based on the degree of the natural language text similarity of respective target fields in grouped incidents of the cluster from among the plurality of incidents, and based on respective evaluation fields. Each of the plurality of clusters is ranked based on the respective quality value of the cluster and a number of the grouped incidents of the cluster. At least one of the ranked plurality of clusters is identified to perform a service management operation.

11 Claims, 9 Drawing Sheets

Related U.S. Application Data

(60) Provisional application No. 62/502,244, filed on May 5, 2017, provisional application No. 62/502,440, filed on May 5, 2017, provisional application No. 62/517,719, filed on Jun. 9, 2017.

(51) Int. Cl.
*G06F 16/28* (2019.01)
*G06F 16/2457* (2019.01)

(56) References Cited

U.S. PATENT DOCUMENTS

| | | | |
|---|---|---|---|
| 2009/0030716 A1* | 1/2009 | Namba | G06Q 10/10 705/300 |
| 2013/0238610 A1 | 9/2013 | Chaturvedi et al. | |
| 2014/0129536 A1* | 5/2014 | Anand | G06Q 10/0635 707/706 |
| 2014/0250125 A1* | 9/2014 | Stuempfle | G06F 17/30994 707/737 |
| 2015/0033077 A1* | 1/2015 | Bhamidipaty | H04L 41/5074 714/37 |
| 2016/0196501 A1* | 7/2016 | Anand | G06Q 10/0635 706/46 |
| 2018/0121417 A1* | 5/2018 | Misra | G06F 17/2785 |

* cited by examiner

400A

| | cluster_id | num_incidents | short_descrip_qual | res_details_qual | score |
|---|---|---|---|---|---|
| 0 | 0 | 192 | 0.732015 | 0.293725 | 1.000000 |
| 73 | 73 | 85 | 1.000000 | 0.310124 | 0.638054 |
| 4 | 4 | 40 | 1.000000 | 0.658418 | 0.637477 |
| 96 | 96 | 29 | 0.865016 | 0.497033 | 0.301079 |
| 100 | 100 | 30 | 0.784361 | 0.433125 | 0.245859 |
| 3 | 3 | 162 | 1.000000 | 0.057612 | 0.225032 |
| 40 | 40 | 125 | 0.746536 | -0.068484 | 0.153658 |
| 37 | 37 | 299 | 0.534749 | -0.036971 | 0.142031 |
| 48 | 48 | 120 | 0.924015 | 0.050309 | 0.133955 |
| 60 | 60 | 97 | 0.605555 | -0.089243 | 0.125795 |
| 95 | 95 | 32 | 1.000000 | 0.148744 | 0.114098 |
| 97 | 97 | 28 | 0.843620 | 0.194746 | 0.110226 |
| 36 | 36 | 34 | 0.902684 | 0.145792 | 0.107179 |

```
{68: [(u'INC0170316', u'Password reset'),         ← 450A
      (u'INC0173534', u'Password reset'),         ← 450B
      (u'INC0144277', u'Password Reset / Change'),
      (u'INC0159224', u'Email Password Reset'),
      (u'INC0160418', u'Password reset'),
      (u'INC0168386', u'Password reset'),
      (u'INC0174363', u'password reset'),
      (u'INC0174463', u'Password reset'),
      (u'INC0157423', u'Password reset.'),
      (u'INC0149683', u'Tech Lounge: Password reset'),
      (u'INC0153034', u'Re: Password Reset'),
      (u'INC0173330', u'Password reset assistance'),
      (u'INC0162426', u'Password reset'),
      (u'INC0166292', u'Tech Lounge: Something is broken password reset'),
      (u'INC0174351', u'Password reset'),
      (u'INC0165871', u'Password reset needed'),
      (u'INC0168886', u'password reset'),
      (u'INC0174225', u'Password Reset'),
      (u'INC0157161', u'Tech Lounge: Password reset')  ← 450N
```

| IDENTIFIED ISSUE TEXT | # OF INCIDENTS (LAST 3 MONTHS) | % OF INCIDENTS (CUMULATIVE) | MOST COMMON RESOLUTION TEXT |
|---|---|---|---|
| PASSWORD RESET | 448 | 1.7% | AFTER ASKING SECURITY QUESTIONS XXXXX'S PASSWORD WAS RESET |
| AD ACCOUNT LOCKED | 298 | 2.8% | PER YOUR REQUEST, WE HAVE UNLOCKED YOUR AD ACCOUNT. |
| UNABLE TO CONNECT TO NON-CORP WIFI | 216 | 3.6% | REINSTALLED THE NEW CERTS FOR NON CORP AND CLEARED THE NETWORK PREFERENCE LISTS |
| CHANGE IN BUSINESS TITLE; JOE XYZ (XXX) | 185 | 4.3% | JOB TITLE UPDATED IN AD AS REQUESTED |
| API INTEGRATIONS PLATFORM ERROR - MDM - | 180 | 5.0% | DUPLICATE TO INC XXXXXX, HENCE CLOSING THE INCIDENT |
| DISK SPACE LOW ON $(XXXXX | 162 | 5.6% | SYSTEM ADMINISTRATOR - CLEARED 17 GIG ON TEMP FILES |
| UNABLE TO CONNECT TO SECUREVPN | 141 | 6.2% | UNLOCKED ACCOUNT, RESET PIN |
| MESSAGE FROM UNKNOWN SENDER (+XXXXXXXXX) | 110 | 6.6% | PASSWORD CHANGE AND SYNC ASSISTANCE UN-JOINED AND RE-JOINED MACHINE TO DOMAIN. PASSWORD CHAIN WAS SUCCESSFUL |
| DID RECLAIM - TERMINATION | 114 | 7.1% | RAN ASSIGN DID IN SURE, DELETED LINE/DEVICES IN CALL MANAGER AND VOICEMAIL |
| MANAGER CHANGE | 106 | 7.5% | CHANGE HAS BEEN MADE, HENCE CLOSING THIS TASK |
| TECH LOUNGE: CERT UPDATE VIA SELF SERVICE | 85 | 7.8% | CERT UPDATE VIA SELF SERVICE |
| EXTENDED END DATE | 52 | 8.0% | NEW EXTENDED END DATE NOTED IN AD |
| VEEAM BACKUP & REPLICATION | 46 | 8.2% | STARTED NEW FULL CHAIN AND BACKUPS ON DATASTORES COMPLETED SUCCESSFULLY |
| JOB CHANGE: JANE DOE (XXX) | 38 | 8.3% | JOB TITLE UPDATED IN AD AS REQUESTED |

FIGURE 5A

IDENTIFYING CLUSTERS FOR SERVICE MANAGEMENT OPERATIONS

CROSS REFERENCE TO RELATED APPLICATIONS

This application is a continuation of and claims priority to U.S. application Ser. No. 15/723,731, filed on Oct. 3, 2017 for all purposes, the content of which are incorporated herein by reference in its entirety. This application claims priority to U.S. Provisional Application No. 62/502,244 filed May 5, 2017, entitled "Service Platform and Use Thereof," by Manjeet Singh, et al. for all purposes, the contents of which are incorporated herein by reference in its entirety. This application also claims priority to U.S. Provisional Application No. 62/502,440 filed May 5, 2017, entitled "Machine Learning Auto Completion of Fields," by Baskar Jayaraman, et al. for all purposes, the contents of which are incorporated herein by reference in its entirety. This application also claims priority to U.S. Provisional Application No. 62/517,719 filed Jun. 9, 2017, entitled "Machine Learning Pilot," by Baskar Jayaraman, et al. for all purposes, the contents of which are incorporated herein by reference in its entirety.

TECHNICAL FIELD

Embodiments described herein generally relate to cloud computing and in particular to grouping historical data of incident reports in a client instance to identify incident clusters for which one or more service management operations may be performed.

BACKGROUND

Cloud computing relates to sharing of computing resources that are generally accessed via the Internet. In particular, cloud computing infrastructure allows users to access a shared pool of computing resources, such as servers, storage devices, networks, applications, and/or other computing-based services. By doing so, users, such as individuals and/or enterprises, are able to access computing resources on demand that are located at remote locations in order to perform a variety of computing functions that include storing and/or processing computing data. For enterprise and other organization users, cloud computing provides flexibility in accessing cloud computing resources without accruing up-front costs, such as purchasing network equipment and investing time in establishing a private network infrastructure. Instead, by utilizing cloud computing resources, users are able redirect their resources to focus on core enterprise functions.

In today's communication networks, examples of cloud computing services a user may utilize include software as a service (SaaS) and platform as a service (PaaS) technologies. SaaS is a delivery model that provides software as a service rather than an end product. Instead of utilizing local network or individual software installations, software is typically licensed on a subscription basis, hosted on a remote machine, and accessed as needed. For example, users are generally able to access a variety of enterprise and/or information technology (IT) related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate enterprise operations without maintaining network infrastructure and/or allocating computing resources normally associated with these functions.

Within the context of cloud computing solutions, support personnel may be asked to deal with higher expectations of response time to infrastructure issues. The goal of most enterprise systems, and cloud computing systems in particular, is very high availability. Accordingly, users of enterprise systems have grown accustom to nearly 100% availability of all enterprise functions. One important aspect of maintaining such high availability is the ability to accurately and quickly address incident reports. Addressing incident reports accurately and quickly may be a costly and time consuming exercise that requires significant manpower if the volume of incident reports is too high. One way to address incident reports accurately and quickly without incurring higher costs or allocating additional resources is to try and reduce the number of incident report that may be created.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment, a cluster identification method includes: obtaining, by one or more hardware processors, client instance data including a plurality of incidents, each incident including a plurality of fields; selecting, by the one or more hardware processors, a target field and an evaluation field from among the plurality of fields; grouping, by the one or more hardware processors, the plurality of incidents of the client instance data into a plurality of clusters based on a degree of a natural language text similarity of respective target fields in the plurality of incidents; determining, by the one or more hardware processors and for each of the plurality of clusters, a quality value based on the degree of the natural language text similarity of respective target fields in grouped incidents of the cluster from among the plurality of incidents, and based on respective evaluation fields in the grouped incidents of the cluster; ranking, by the one or more hardware processors, each of the plurality of clusters of the client instance data based on the respective quality value of the cluster and a respective number of the grouped incidents of the cluster of the client instance data; and identify, by the one or more hardware processors, at least one of the ranked plurality of clusters to perform a service management operation associated with the cluster.

In another embodiment, the cluster identification method may be embodied in computer executable program code and stored in a non-transitory storage device. In yet another embodiment, the method may be implemented in an electronic device having image capture capabilities.

BRIEF DESCRIPTION OF DRAWINGS

For a more complete understanding of this disclosure, reference is now made to the following brief description, taken in connection with the accompanying drawings and detailed description, wherein like reference numerals represent like parts.

FIGS. 4A-4B show examples of artifacts 400A and 400B generated by the cluster identification operation illustrated in flowchart 300 of FIG. 3 in accordance with one or more disclosed embodiments.

FIGS. 5A-5B show snapshots 500A and 500B of an exemplary report of a plurality of clusters that are identified and ranked based on the cluster identification operation illustrated in flowchart 300 of FIG. 3 in accordance with one or more disclosed embodiments.

DESCRIPTION OF EMBODIMENTS

Figure 1:
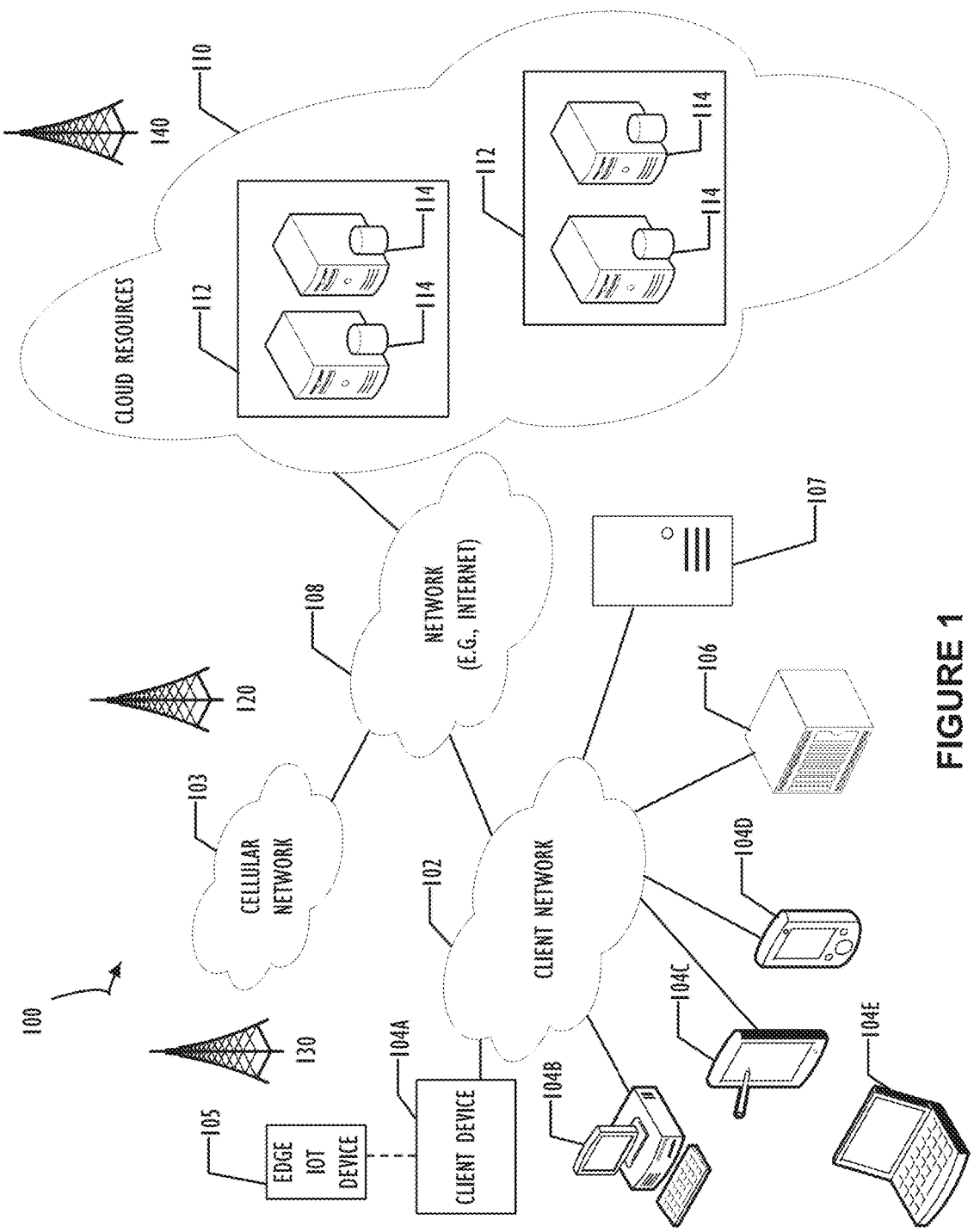
FIG. 1 illustrates a block diagram of a cloud computing infrastructure 100 where one or more embodiments of the present disclosure may operate.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. Moreover, the language used in this disclosure has been principally selected for readability and instructional purposes, and may not have been selected to delineate or circumscribe the inventive subject matter, resorting to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

The term "computing system" is generally taken to refer to at least one electronic computing device that includes, but is not limited to, a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

This disclosure pertains to cluster identification in IT service management. Techniques described herein look to extract historical data of closed incidents from a client instance, group similar incidents into clusters, and identify high priority clusters of similar incidents for performing a service management operation. In one embodiment, the incident reports may be grouped into a plurality of clusters based on text similarity of a respective natural language text input field (e.g., incident short description text field) of the incident reports and a respective quality value of each of the plurality of clusters may be determined based on predetermined criteria. For each of the plurality of clusters, another quality value may be determined based on degree of text similarity of another respective natural language text input field (e.g., incident work notes or close notes or additional comments field) of the grouped incidents of the cluster and based on a respective validation field (e.g., incident category or assignment group field) to determine an overall ranking of the plurality of clusters, taking into account the respective number of incident reports included in the cluster. Out of the ranked clusters, those clusters may be identified where the type of issue corresponding to the cluster can be addressed by performing a service management operation. For example, a conversation tree may be created for a highly ranked cluster of incident reports to implement a virtual agent (e.g., chat bot). Future incidents associated with the cluster may then be deflected to the virtual agent for automated resolution. Other product or service recommendations may also be delivered to the user of the client instance based on the rankings of the plurality of clusters of incident reports and the identified clusters that can be addressed by performing service management operations.

Users of the client instance may not have visibility into the top types of issues (for which incident reports may be created) affecting their enterprise. For example, the user may be aware of the top one or two types of routinely occurring incidents but does not have clear visibility into the other types of routinely occurring incidents beyond the top one or two. In one embodiment, the cluster identification operation highlights similar types of incidents by volume and actual text strings of the types of issues may be provided so that the user can understand the top percentage of issues of the client instance. Incident types (clusters) that are ripe for further service management operations through product or service recommendations may be identified. Conversation trees, and intent-response pairs corresponding to an identified type of incident cluster may be defined to implement a virtual agent for automated deflection and resolution of future incidents by the virtual agent when an incident similar to the identified type of incident is detected. In the virtual agent context, the cluster identification analysis may indicate an issue text, which directly relates to an intent, and the clustered resolution text may indicate dialog reply to that intent. Further, recommendations may be provided regarding types of knowledge articles to target based on the top types of incidents identified using the cluster analysis. Recommended issue clusters, alongside resolution clusters may provide an indication of the types of knowledge articles that may be targeted for recommendation.

FIG. 1 illustrates a block diagram of an embodiment of a cloud computing infrastructure 100 where one or more embodiments of the present disclosure may operate. Cloud computing infrastructure 100 comprises a client network 102, network 108, and a cloud resources platform/network 110. In one embodiment, the client network 102 may be a local private network, such as local area network (LAN) that includes a variety of network devices that include, but are not limited to switches, servers, and routers. Each of these networks can contain wired or wireless programmable devices and operate using any number of network protocols (e.g., TCP/IP) and connection technologies (e.g., WiFi® networks, Bluetooth®). Wi-Fi is a registered trademark of the Wi-Fi Alliance. Bluetooth is a registered trademark of Bluetooth Special Interest Group. In another embodiment, client network 102 represents an enterprise network that could include or be communicatively coupled to one or more local area networks (LANs), virtual networks, data centers and/or other remote networks (e.g., 108, 110). As shown in FIG. 1, client network 102 may be connected to one or more client devices 104A-E and allow the client devices to communicate with each other and/or with cloud resources platform/network 110. Client devices 104A-E may be computing systems such as desktop computer 104B, tablet computer 104C, mobile phone 104D, laptop computer (shown as wireless) 104E, and/or other types of computing systems generically shown as client device 104A. Cloud computing infrastructure 100 may also include other types of devices generally referred to as Internet of Things (IoT) (e.g., edge IOT device 105) that may be configured to send and receive information via a network to access cloud computing services or interact with a remote web browser application (e.g., to receive configuration information). FIG. 1 also illustrates that client network 102 may be connected to a local compute resource 106 that may include a server, access point, router, or other device configured to provide for local computational resources and/or to facilitate communication amongst networks and devices. For example, local compute resource 106 may be one or more physical local hardware devices configured to communicate with wireless network devices and/or facilitate communication of data between client network 102 and other networks such as network 108 and cloud resources platform/network 110. Local compute resource 106 may also facilitate communication between other external applications, data sources, and services, and client network 102. FIG. 1 also illustrates that client network 102 may be connected to a computer configured to execute a management, instrumentation, and discovery (MID) server 107. For example, MID server 107 may be a Java® application that runs as a Windows® service or UNIX® daemon. Java is a registered trademark of Oracle America, Inc. Windows is a registered trademark of Microsoft Corporation. UNIX is a registered trademark of The Open Group. MID server 107 may be configured to assist functions such as, but not necessarily limited to, discovery, orchestration, service mapping, service analytics, and event management. MID server 107 may be configured to perform tasks for a cloud-based instance while never initiating communication directly to the cloud-instance by utilizing a work queue architecture. This configuration may assist in addressing security concerns by eliminating that path of direct communication initiation.

Cloud computing infrastructure 100 also includes cellular network 103 for use with mobile communication devices. Mobile cellular networks support mobile phones and many other types of mobile devices such as laptops etc. Mobile devices in cloud computing infrastructure 100 are illustrated as mobile phone 104D, laptop 104E, and tablet 104C. A mobile device such as mobile phone 104D may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices such as wireless access points and routers (e.g., local compute resource 106). In addition, the mobile devices may interact with other mobile devices or with non-mobile devices such as desktop computer 104B and various types of client device 104A for desired services. Although not specifically illustrated in FIG. 1, client network 102 may also include a dedicated network device (e.g., gateway or router) or a combination of network devices that implement a customer firewall or intrusion protection system.

FIG. 1 illustrates that client network 102 is coupled to a network 108. Network 108 may include one or more computing networks available today, such as other LANs, wide area networks (WANs), the Internet, and/or other remote networks, in order to transfer data between client devices 104A-E and cloud resources platform/network 110. Each of the computing networks within network 108 may contain wired and/or wireless programmable devices that operate in the electrical and/or optical domain. For example, network 108 may include wireless networks, such as cellular networks in addition to cellular network 103. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio-based networks as would be appreciated by one of ordinary skill in the art upon viewing this disclosure. Network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, cloud resources platform/network 110 is illustrated as a remote network (e.g., a cloud network) that is able to communicate with client devices 104A-E via client network 102 and network 108. The cloud resources platform/network 110 acts as a platform that provides additional computing resources to the client devices 104A-E and/or client network 102. For example, by utilizing the cloud resources platform/network 110, users of client devices 104A-E may be able to build and execute applications, such as automated processes for various enterprise, IT, and/or other organization-related functions. In one embodiment, the cloud resources platform/network 110 includes one or more data centers 112, where each data center 112 could correspond to a different geographic location. Within a particular data center 112 a cloud service provider may include a plurality of server instances 114. Each server instance 114 may be implemented on a physical computing system, such as a single electronic computing device (e.g., a single physical hardware server) or could be in the form of a multi-computing device (e.g., multiple physical hardware servers). Examples of server instances 114 include, but are not limited to, a web server instance (e.g., a unitary Apache® installation), an application server instance (e.g., unitary Java Virtual Machine), and/or a database server instance (e.g., a unitary MySQL® catalog). Apache is a registered trademark of Apache Software Foundation. MySQL is a registered trademark of MySQL AB.

To utilize computing resources within cloud resources platform/network 110, network operators may choose to configure data centers 112 using a variety of computing infrastructures. In one embodiment, one or more of data centers 112 are configured using a multi-tenant cloud architecture such that a single server instance 114, which can also be referred to as an application instance, handles requests and serves more than one customer. In some cases, data centers with multi-tenant cloud architecture commingle and store data from multiple customers, where multiple client instances are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer. In a multitenancy environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 114 causing outages for all customers allocated to the single server instance 114.

In another embodiment, one or more of the data centers 112 are configured using a multi-instance cloud architecture to provide every customer its own unique client instance. For example, a multi-instance cloud architecture could provide each client instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each client instance. In a multi-instance cloud architecture, multiple client instances could be installed on a single physical hardware server where each client instance is allocated certain portions of the physical server resources, such as computing memory, storage, and processing power. By doing so, each client instance has its own unique software stack that provides the benefit of data isolation, relatively less downtime for customers to access the cloud resources platform/network 110, and customer-driven upgrade schedules. An example of implementing a client instance within a multi-instance cloud architecture will be discussed in more detail below when describing FIG. 2.

In one embodiment, utilizing a multi-instance cloud architecture, a first client instance may be configured with a client side application interface such as, for example, a web browser executing on a client device (e.g., one of client devices 104A-E of FIG. 1). In this example, an end-user may interact with the web browser to complete a web form associated with defining an incident report. Historical information of closed incident reports of the client instance may be stored on a storage device associated with the client network 102 and/or in the client instance located within cloud resources platform/network 110.

Figure 2:
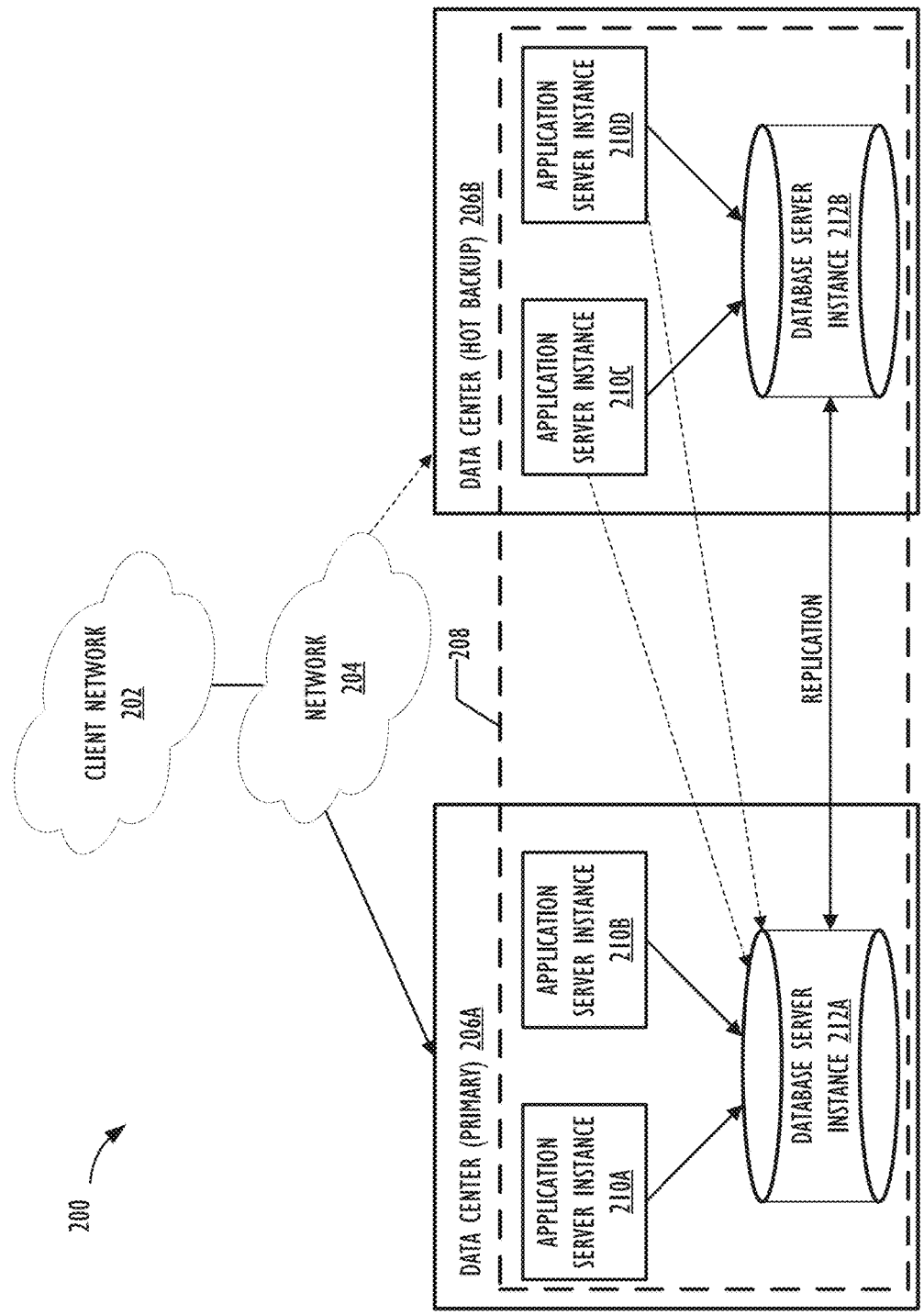
FIG. 2 illustrates a block diagram of a multi-instance cloud architecture 200 where one or more embodiments of the present disclosure may operate.

FIG. 2 illustrates a block diagram of an embodiment of a multi-instance cloud architecture 200 where embodiments of the present disclosure may operate. FIG. 2 illustrates that the multi-instance cloud architecture 200 includes a client network 202 that connects to two data centers 206A and 206B via network 204. Client network 202 and network 204 may be substantially similar to client network 102 and network 108 as described in FIG. 1, respectively. Data centers 206A and 206B can correspond to FIG. 1's data centers 112 located within cloud resources platform/network 110. Using FIG. 2 as an example, a client instance 208 is composed of four dedicated application server instances 210A-210D and two dedicated database server instances 212A and 212B. Stated another way, the application server instances 210A-210D and database server instances 212A and 212B are not shared with other client instances 208. Other embodiments of multi-instance cloud architecture 200 could include other types of dedicated server instances, such as a web server instance. For example, client instance 208 could include the four dedicated application server instances 210A-210D, two dedicated database server instances 212A and 212B, and four dedicated web server instances (not shown in FIG. 2).

To facilitate higher availability of client instance 208, application server instances 210A-210D and database server instances 212A and 212B are shown to be allocated to two different data centers 206A and 206B, where one of data centers 206 may act as a backup data center. In reference to FIG. 2, data center 206A acts as a primary data center that includes a primary pair of application server instances 210A and 210B and primary database server instance 212A for client instance 208, and data center 206B acts as a secondary data center to back up primary data center 206A for client instance 208. To back up primary data center 206A for client instance 208, secondary data center 206B includes a secondary pair of application server instances 210C and 210D and a secondary database server instance 212B. Primary database server instance 212A is able to replicate data to secondary database server instance 212B. As shown in FIG. 2, primary database server instance 212A replicates data to secondary database server instance 212B using a replication operation such as, for example, a Master-Master MySQL Binlog replication operation. The replication of data between data centers could be implemented in real time or by implementing full backup weekly and daily incremental backups in both data centers 206A and 206B. Having both a primary data center 206A and secondary data center 206B allows data traffic that typically travels to the primary data center 206A for client instance 208 to be diverted to secondary data center 206B during a failure and/or maintenance scenario. Using FIG. 2 as an example, if application server instances 210A and 210B and/or primary data server instance 212A fail and/or are under maintenance, data traffic for client instance 208 can be diverted to secondary application server instances 210C and 210D and secondary database server instance 212B for processing.

Although FIGS. 1 and 2 illustrate specific embodiments of cloud computing system 100 and multi-instance cloud architecture 200, respectively, the disclosure is not limited to the specific embodiments illustrated in FIGS. 1 and 2. For instance, although FIG. 1 illustrates that cloud resources platform/network 110 is implemented using data centers, other embodiments of the cloud resources platform/network 110 are not limited to data centers and can utilize other types of remote network infrastructures. Moreover, other embodiments of the present disclosure may combine one or more different server instances into a single server instance. Using FIG. 2 as an example, application server instances 210 and database server instances 212 can be combined into a single server instance. The use and discussion of FIGS. 1 and 2 are only exemplary to facilitate ease of description and explanation.

Figure 3:
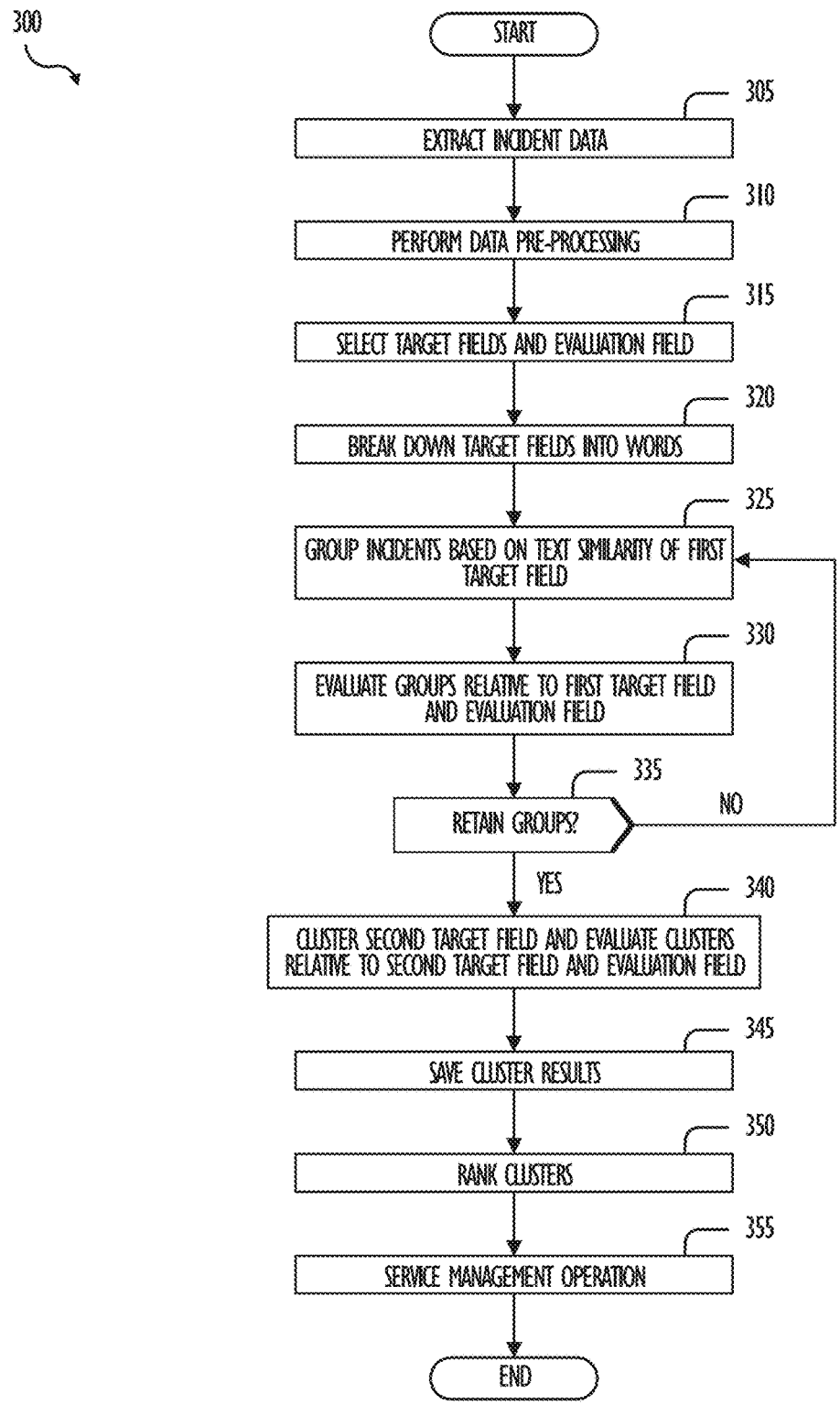
FIG. 3 shows a flowchart 300 illustrating a cluster identification operation to identify incident clusters for a service management operation in accordance with one or more disclosed embodiments.

Referring now to FIG. 3, flowchart 300 illustrates a flow of operations that may be executed by a computing system to perform cluster identification on incidents reports of the client instance 208 and detect incident clusters on which a service management operation may be performed in accordance with one or more disclosed embodiments. For purposes of explanation, the following steps will be described in the context of FIG. 2. However, it should be understood that the various actions may be taken by alternate components. In addition, the various actions may be performed in a different order. Further, some actions may be performed simultaneously, and some may not be required, or others may be added.

Historical data of incident reports may be used and only previously closed incident reports that have gone through the entire incident management life cycle may be selected. Further, historical incident data from only a particular client instance is used to identify incident clusters specific to the particular client instance. This is because the frequency and types of incidents of the incident clusters may be different for each client instance. By selecting historical incident data particular to the client instance, the cluster analysis and resulting identification of service management operations and recommendations may be personalized for the client instance. In one embodiment, client instance 208 may execute instructions to perform one or more of the cluster identification operations illustrated in flowchart 300. In another embodiment, a processor external to client instance 208 may perform one or more of the cluster identification operations illustrated in flowchart 300. For example, one or more of the cluster identification operations may be performed by a processor of one of the client devices 104A-E.

Flowchart 300 begins at block 305 where the computing system extracts historical data of incident reports of client instance 208. The historical data may be limited to a particular client, a particular time period, and selected for only completed incident reports so the data may represent a high degree of accuracy. In one embodiment, an entire dataset of historical data of client instance 208 may be extracted. In another embodiment, if the dataset is relatively large (e.g., more than 50,000 rows), only a stratified sampling representing an even sampling of the historical data may be extracted for clustering. The data may be extracted directly out of client instance 208 or may be offline data obtained in the form of a spreadsheet or a comma-separated values (CSV) file. In another embodiment, client instance 208 that has opted in to use the functionality provided by the cluster identification operation may send its incident data to a secure storage where the computing system may act upon the historical data to perform the cluster analysis and provide results to client instance 208. The data may then be deleted from the secure storage.

At block 310 the computing system performs pre-processing on the incident report data. As an example, data pre-processing may also include ignoring numbers or punctuation, junk characters, setting stopwords, ignoring frequent words occurring in more than a predetermined percentage of the incident reports, ignoring infrequent words occurring in less than a predetermined percentage or number of the incident reports, and setting an Ngram range of words to be considered as one contiguous sequence. For example, a low range and a high range of the Ngram may be set so that each word may be treated independently or a grouping of two or more words may be treated as a group for determining text similarity between the incident reports. The data pre-processing may further include functions to improve consistency of data or create composite information. In one example, there may be records that refer to "e-mail" while other records refer to "email." Changing all records to be consistent and removal of extra non-meaningful characters may increase the ability to form matches across the data.

At block 315, the computing system selects target fields and an evaluation field for performing the cluster identification operation on the incident reports. Incident reports may be thought of as help desk tickets. In general, a help desk receives information from users about infrastructure abnormalities. For example, a help desk may receive an incident report from a customer that they need to reset their password, or a customer may complain that a service is down or running slowly. One common way for a user to provide an incident report is for the user to complete a web based form describing the complaint/issue. In general, web based forms may have a plurality of fields with some fields being completed in natural language (e.g., free flow text in the user's own words) and others being selected from a pre-determined set of applicable values. The pre-determined set of applicable values is generally presented in a drop-down selection box where a user may only select from the pre-determined set. Further, incident reports typically have multiple attributes that may be used to facilitate processing (e.g., corrective action) of the incident report. For example, these attributes may include, but not be limited to, priority, category, classification, and assignment. Priority may be used to determine an order in which to dedicate resources for resolution of the incident report. Category may be used to group incidents that are similar to each other. Classification may be used to identify a class of incident (e.g., desktop, server, mobile device, etc.). Assignment may be used to determine a work group responsible for correcting the incident. These attributes may be set for each incident report and may be selectable from a group of pre-defined set of values.

Returning to block 315, the target fields may include a first target field and a second target field that is different from the first target field. Each of the first and second target fields may be any text based field completed in natural language (e.g., free flow text in the user's own words) and included in each of the incident reports. For example, the first target field may be an incident short description text field in which the incident is described in the user's own words. In one embodiment, grouping of the incident reports into the plurality of clusters may be performed based on the text included in the first target field. The second target field may be a text field describing an incident report's resolution details. For example, the second target field may be a work notes or close notes field or a field created or renamed to store resolution details of the incident report. The evaluation field may correspond to one or more of the attributes that are typically set for each incident report and are typically allowed to be selected from a group of pre-defined set of values. For example, the evaluation field may correspond to the category attribute or the assignment attribute of the incident report, and is used to determine a quality of the clustering of incident reports performed by the cluster identification operation. More specifically, the evaluation field is not directly used in the clustering itself but is used in the scoring of the clustering by determining whether or not the grouped incident reports of a particular cluster all generally have the same attribute values. For example, each incident report included in a cluster named "Unable to connect to now-corp wifi" should be assigned to the same work group for correcting the incident (i.e., assignment attribute value of each incident report must me the same), and the evaluation field is used to check whether each incident report included in the cluster named "Unable to connect to now-corp wifi" has the same assignment attribute value. A primary key field may also be selected at block 315 to uniquely identify each incident report extracted at block 305. For example, an incident identifier field may be selected at block 315. Essentially, any field may be selected as the primary key field of the incident report as long as it is unique.

At block 320 the computing system selects text in the first and second target fields of the incident report and breaks down the text into single words or two or more words to consider as one contiguous sequence. The broken down words of the first target field are then compared across rows of incident reports at block 325 to determine word similarity, and incident reports with similar words in respective first target fields are grouped based on a data clustering algorithm. That is, the cluster identification operation starts creating a group of corresponding incident reports when word similarities are found between the broken down words of the first target field of the plurality of incident reports. Data clustering algorithms that may be used for identifying text similarity are commonly known in the art and detailed explanation thereof is omitted here. Examples of the data clustering algorithms that can be used are kmeans (or minibatchkmeans) or DBSCAN. The data clustering algorithms may accept input parameters that may be fine-tuned. An example tunable input parameter may be a similarity value indicating how similar two input texts have to be for them to be considered as belonging to the same group. The similarity value may indicate a maximum permissible distance between two texts for them to be considered as belonging to the same group. The similarity value input parameter may be fine-tuned to control how 'tight' the group is or how close (or similar) the words have to be from row-to-row for them to be considered as part of the same group. If the similarity value is too high, incident reports that should be included in the same group may end up being in two different groups. For example, an incident report with a short description text field value of "Password reset" may end up being in a different group from an incident report with a short description text field value of "Reset password," when they should be in the same group. On the other hand, if the similarity value is too low, incident reports that should not be grouped together may be assigned to the same group. In both situations, the value of grouping is lost and therefore, it is important to fine-tune the similarity value input parameter so as to achieve ideal clustering of the incident reports while avoiding false positives and false negatives. Another example tunable input parameter may be a threshold value identifying a number of incident reports that have to be included in a group for the group to be considered a cluster. Yet another example tunable input parameter may be a total number of clusters that the incident report data is to be grouped into.

At block 330 the computing system evaluates each of the plurality of groups created at block 325 relative to the respective first target fields and evaluation fields to determine the quality of the grouping. More specifically, each group formed based on text similarity of the first target field and in accordance with the set tunable parameters at block 325 is evaluated based on a degree of the text similarity across the respective first target fields of incident reports included in the group and based on whether or not the incident reports included in the group all have the same attribute values for the respective evaluation fields. In one embodiment, based on the evaluation at block 325 a value between −1 and +1 is assigned to the group depending on the degree of text similarity across the respective first target fields of the incident reports included in the group and based on whether or not each incident report included in the group has the same assignment attribute value (e.g., workgroup responsible for correcting the incident) or same category attribute value (e.g., password issues, account issues, HR issues, etc.). In one or more embodiments, a higher evaluation value indicates closer natural language text similarity between the incident reports of the group. Thus, for example, a group having an evaluation value of +1 is an example of a perfect cluster indicating that natural language text in every row (incident report) belonging to the group is very similar and relates to the same type of issue. In one embodiment, detection of perfect clusters may indicate automation opportunities for implementing service management operations. That is, natural language text independently entered by different users of client instance 208 over a period of time for creating respective incident reports is likely to be at least somewhat different, even if the respective incident reports are created to address the same type of issue. Although the text in the respective first target fields of the grouped incidents may be slightly different from row to row, since the cluster has been detected to be a perfect cluster based on the evaluation, the detected cluster may indicate a type of issue that may be automated, for example, implementing a virtual agent or other service management operation.

At block 335 the computing system may determine whether or not the groups formed at block 325 should be retained based on the respective evaluation values of the groups. That is, if the tunable parameters set at block 325 result in a very large number of groups at block 325 or result in groups that have low evaluation values (i.e., quality of grouping is too low) at block 330, then the computing system may indicate that the groups are not to be retained at block 335. In one embodiment, the determination at block 335 to retain the groups may rely on user input. In another embodiment, the determination at block 335 may be automatically made without any user operation. If it is determined that the groups may not be retained ("NO" at block 335), operation returns to block 325 where the tunable parameters may be adjusted further to, for example, require a higher degree of text similarity between two records to be considered in the same group or require a higher number of incident reports to be grouped together for the group to be considered as a cluster. Re-grouping may then be performed at block 325 based on the adjusted parameters and the groups may then be re-evaluated at block 330 to determine the respective evaluation values of the groups as explained above.

If, on the other hand, it is determined that the number and/or quality of the groups are satisfactory and may be retained ("YES" at block 335), the computing system saves results of the respective groups as clusters and for each of the clusters, the computing system performs data clustering on the broken down words of the respective second target fields of incident reports included in the cluster to determine a degree of text similarity of the respective second target fields included in the cluster, and evaluates each cluster relative to the respective second target fields and evaluation fields to determine a quality of the grouping (block 340). More specifically, each saved cluster formed based on text similarity of the first target field is further evaluated based on a degree of the text similarity across the respective second target fields of the incident reports included in the cluster and based on whether or not the incident reports included in the cluster all have the same attribute values for the respective evaluation fields. In one embodiment, based on the evaluation at block 340 a value between −1 and +1 is assigned to the cluster depending on the degree of text similarity across the respective second target fields of the incident reports included in the cluster and based on whether or not each incident report included in the cluster has the same assignment attribute value (e.g., workgroup responsible for correcting the incident) or same category attribute value (e.g., password issues, account issues, HR issues, etc.).

At block 345, for each of the plurality of clusters, the computing system obtains a respective number of the incident reports included in the cluster. Further at block 345, the computing system may automatically generate a text description of the respective first and second target fields of the cluster. The computing system may then save one or more of the following values for each of the plurality of clusters in association with each other: (i) the respective number of the incident reports included in the cluster; (ii) the first evaluation value of the clustering determined based on the evaluation relative to the first target field and the evaluation field at block 330; (iii) the second evaluation value of the clustering determined based on the evaluation relative to the second target field and the evaluation field at block 340; and (iv) the auto generated description of the respective first and second target fields of the cluster. At block 350, the computing system ranks the plurality of clusters based on the results from block 345. More specifically, the plurality of clusters may be ranked by calculating a score value of each of the plurality of clusters based on the respective number of incident reports and the respective first and second evaluation values of the cluster. In one embodiment, the score value may be normalized such that the highest ranked cluster is assigned the value of 1.0 and the lower ranked clusters are assigned a value less than 1.0. Information regarding the ranked clusters may be presented to a user of client instance 208.

FIGS. 4A-4B show examples of two artifacts 400A-400B that may be internal to client instance 208 and generated as output of the cluster identification operation performed by flowchart 300 of FIG. 3 in accordance with one or more embodiments. In one embodiment, the two artifacts 400A-400B may be stored in a storage device at client instance 208 and output to the user. In another embodiment, the two artifacts 400A-400B may be internal to client instance 208 and used only to generate the report 500A-500B shown in FIGS. 5A-5B (described in detail below).

FIG. 4A illustrates an example ranked list 400A of a plurality of clusters generated by performing the cluster identification operation of FIG. 3 on historical data of incident reports of an exemplary client instance. As shown in FIG. 4A, the example ranked list includes columns for: cluster_id 405, num_incidents 410, short_descrip_qual 415, res_details_qual 420, and score 425. Cluster_id 405 refers to a unique identifier for identifying each of the plurality of clusters; num_incidents 410 refers to the respective number of the incident reports that are included in each of the plurality of clusters; short_descrip_qual 415 refers to the first evaluation value of the clustering determined based on the evaluation relative to the first target field (in the example shown in FIG. 4A, short description text field of the incident reports) and the evaluation field; res_details_qual 420 refers to the second evaluation value of the clustering determined based on the evaluation relative to the second target field (in the example shown in FIG. 4A, resolution details text field of the incident reports) and the evaluation field; and score 425 refers to the score value assigned to each of the plurality of clusters and calculated in accordance with the calculation at block 350 of FIG. 3. As illustrated in FIG. 4A, the plurality of clusters may be ranked and listed in a descending order based on score 425 of each cluster. The columns illustrated in FIG. 4A are by way of example only and other different or additional columns may be presented based on the target fields selected during the cluster identification operation.

With the ranked list 400A illustrated in FIG. 4A, clusters with the best combination of the number of incidents and the quality of groupings for the first and second target fields may be identified, thereby providing insight with a high level of confidence into, for example, the most frequent types of questions the users are asking and certain knowledge of what the answers to those questions may be. In other words, by generating the quality values for the first and second target fields for each of the clusters, determining the number of incident reports included in the clusters and ranking the clusters, a better understanding can be obtained about what the issue (i.e., type of incident) corresponding to a cluster is and what is the result or resolution for that issue. Further, because the number of incident reports corresponding to each cluster is taken into consideration in determining the overall score of the cluster, return on investment for any service management operation that may be implemented for a given cluster is ensured. For example, in the artifact 400A shown in FIG. 4A, although cluster_id 73 has higher quality values for the short description field (1.000000) and the resolution details field (0.310124) than the respective quality values of cluster_id 0, since the number of incidents of cluster_id 73 is only 85, cluster_id 73 has a lower overall score (0.638054) (and a lower return on investment) than cluster_id 0 because the number of incidents of cluster_id 0 is 192 which is higher than the number of incidents (85) of cluster_id 73.

FIG. 4B shows a snapshot 400B of an exemplary cluster from among a plurality of clusters generated by performing the cluster identification operation of FIG. 3. In the example shown in FIG. 4B, the plurality of rows 450A, 450B, . . . 450N correspond to a plurality of incident reports that belong to the cluster. Each row 450A, 450B, . . . 450N includes values of the extracted primary key field 460A and corresponding text of the first target field (in the example shown in FIG. 4B, short description text field) 460B. As illustrated in FIG. 4B, although the text in first target field 460B across the plural rows is not identical, the text is substantially similar across the plural rows and hence, the rows are grouped together to form a "password reset" cluster.

Figure 5B:
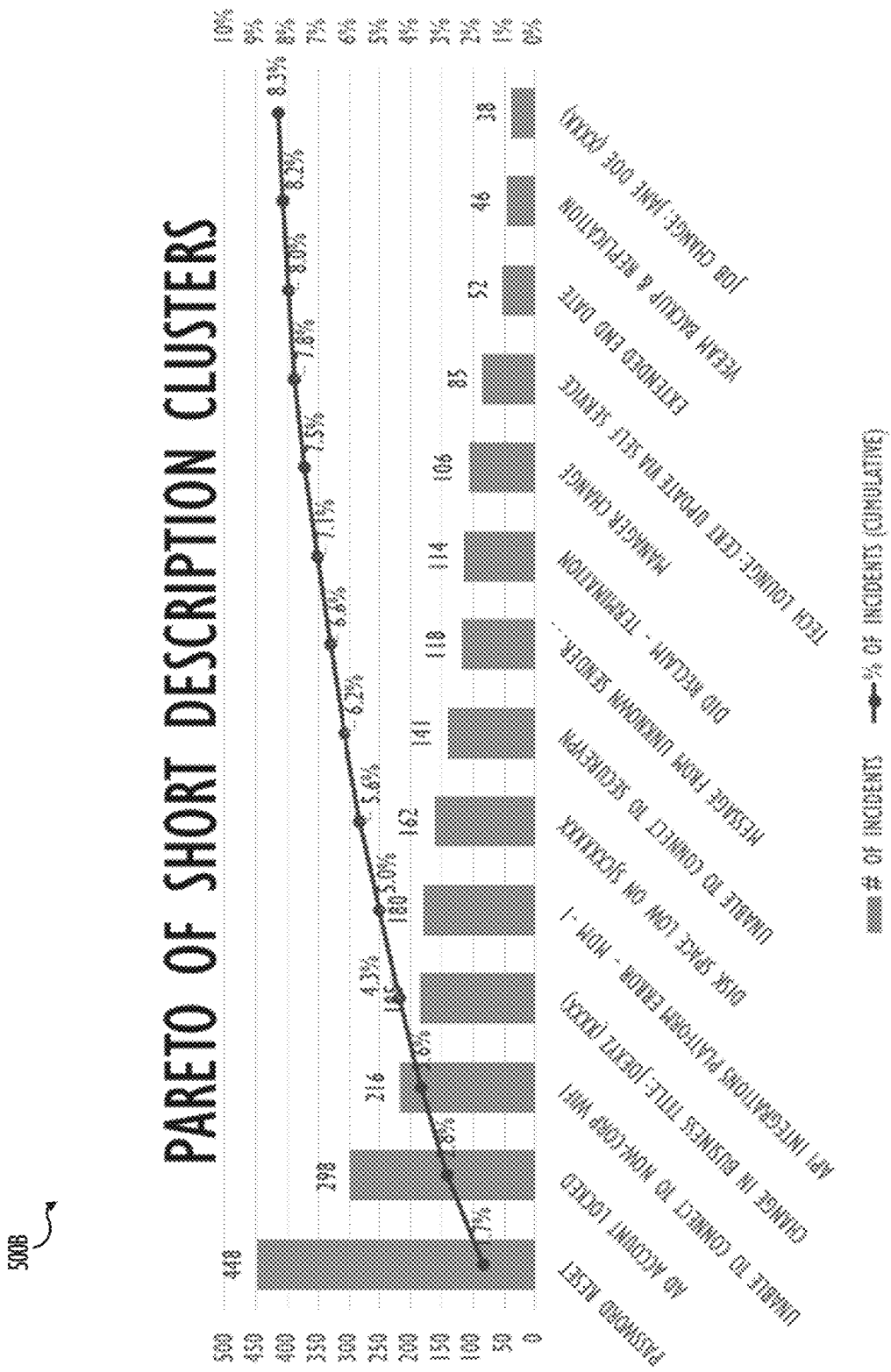

FIGS. 5A-5B show snapshots 500A and 500B of an exemplary report of a plurality of clusters that are identified and ranked in accordance with the cluster identification operation of FIG. 3 in accordance with one or more embodiments. The report may be presented to a user of client instance 208 so that the user may determine whether to authorize performance of one or more of the recommended service management operations with respect to one or more of the identified and ranked clusters. As shown in snapshot 500A of FIG. 5A, data of a plurality of columns is presented for each cluster. In the example shown in FIG. 5A, the columns include: Identified Issue Text 505, # of Incidents (Last 3 Months) 510, % of Incidents (Cumulative) 515, and Most Common Resolution Text 520. The columns shown in FIG. 5A are illustrative only and other different or additional columns may be presented. Identified Issue Text 505 may correspond to a text phrase generated based on the respective first target fields (e.g., short description field) of incident reports included in the cluster; # of Incidents (Last 3 Months) 510 may correspond to the number of incident reports that have been generated in the past three months and that are included in the cluster; % of Incidents (Cumulative) 515 may correspond to a cumulative percentage of the incident reports that belong to the corresponding cluster out of the total number of incident reports extracted as the historical incident data of client instance 208; and Most Common Resolution Text 520 may correspond to a text phrase generated based on the respective second target fields (e.g., work notes or close notes field) of incident reports included in the cluster. In one embodiment, the text phrase of the first and second target fields of each cluster may be auto generated. In another embodiment, the text phrase may be provided by a user. FIG. 5B shows a snapshot 500B in which a portion of the information presented in snapshot 500A of FIG. 5A is presented as a pareto chart. In FIG. 5B, the respective text phrases generated based on the respective first target fields (e.g., short description field) of the incident reports included in each of the plurality of clusters are presented on the X-axis and respective numbers of incident reports included in the plurality of clusters are presented along the Y-axis. Cumulative percentages of the incident reports that belong to the corresponding clusters out of the total number of incident reports extracted as the historical incident data of client instance 208 are also presented in the pareto chart.

Returning to FIG. 3, at block 355 the computing system identifies one or more service management operations based on the ranked and listed clusters and presents the service management operations to a user of client instance 208 as product or service recommendations. An example implementation of the operations performed at block 355 is described in detail below in connection with FIG. 7.

Although in the embodiment disclosed in FIG. 3, a cluster identification operation is described in which clustering is performed relative to the first target field and the further relative to the second target field, the present disclosure is not limited thereto. In another embodiment, the cluster identification operation may involve performing clustering relative to only one target field, and then identifying clusters for performing service management operations based on the clustering of the one target field. In yet another embodiment, the cluster identification operation may involve performing clustering relative to three or more target fields, and then clusters may be identified and ranked for performing service management operations based on evaluation values of the clustering relative to the three or more target fields.

Figure 6:
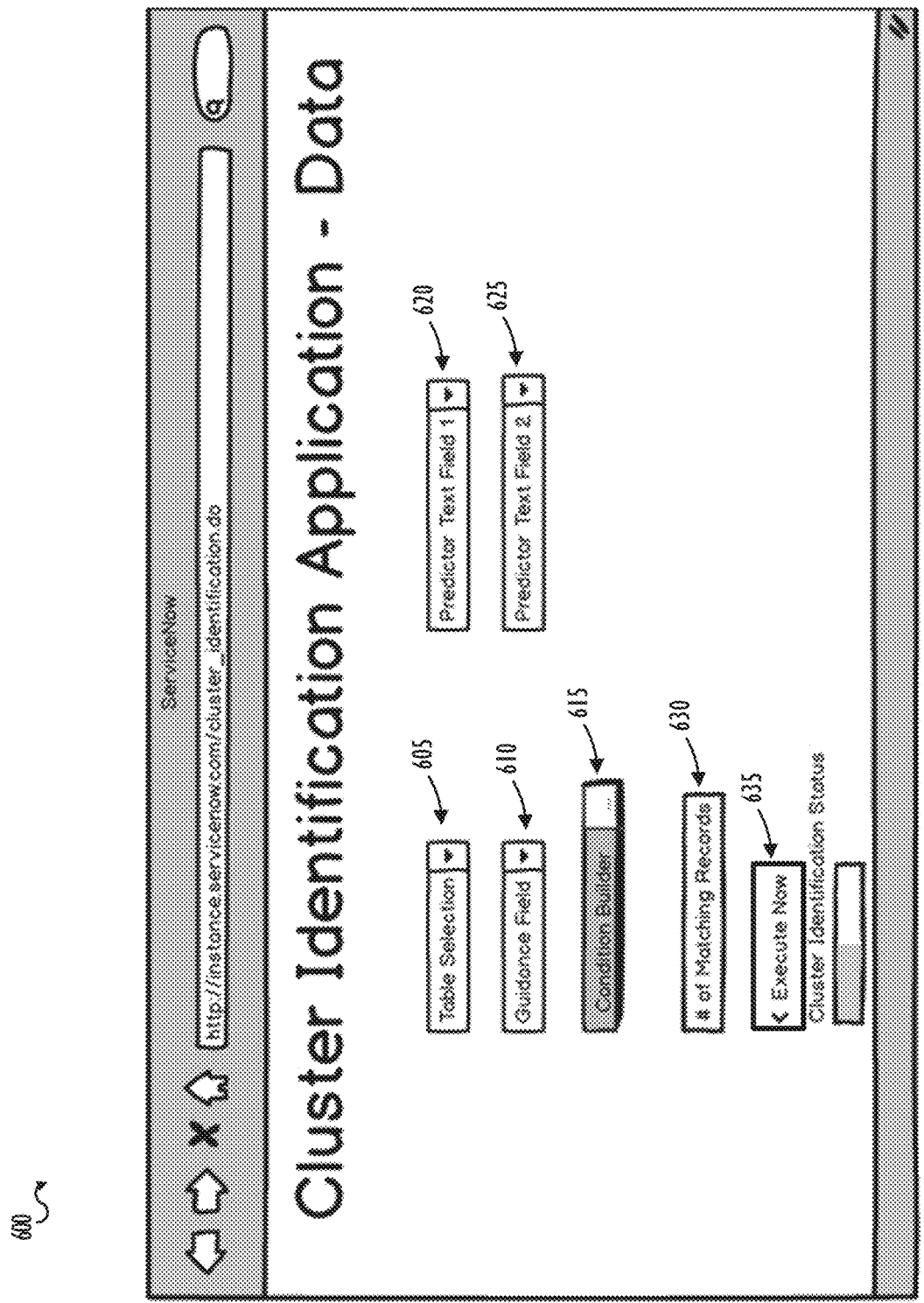
FIG. 6 shows a screen shot of a graphical user interface (GUI) 600 in accordance with one or more embodiments.

FIG. 6 shows a screen shot of a graphical user interface (GUI) 600 in accordance with one or more embodiments. GUI 600 may be displayed on a display to perform the cluster identification operation by the computing system. GUI 600 may include one or more user interactive screens that allow for a user to interact with a program of the computing system performing one or more of the operations described in FIG. 3. GUI 600 may indicate to a user that the computing system is available to receive input values 605-625 from a user (e.g., via an input interface) to control GUI 600. As illustrated, input value 605 corresponds to a Table Selection field to select a client instance whose historical incident report data is to be extracted to perform the cluster identification operation. Input values 610, 620 and 625 respectively correspond to the evaluation (guidance) field, and the first and second target fields based on which the incident report data is to be clustered. Input value 615 corresponds to a Condition Builder to set certain conditions and filter data based on the set conditions. That is, conditions may be set to filter the historical incident report data to extract only those incident reports that match the set condition. For example, a condition may be set to extract incident reports that have happened only in the past six months, or a condition may be set to extract incident reports that belong only to a particular geographic region. By setting conditions using the Condition Builder 615, clustering can be limited only to those incident reports that satisfy the condition. The number of incident reports that satisfy the condition may be presented as output value 630 (# of Matching Records) on GUI 600. While input values 605-625 are illustrated in FIG. 6, it is appreciated that a fewer number or greater number of input values may be presented in connection with GUI 600. Additionally and/or alternately, other conditions separate from or in addition to those described above may correspond to input values 605-625. Operational command 635 may also be present on GUI 600 and may correspond to an instruction to execute the program of the computing system implementing one or more of the operations described in FIG. 3. After a user operates the operational command 635 to instruct execution of the cluster identification operation, snapshots 500A and 500B shown in FIGS. 5A-5B may be generated and presented to the user to report a plurality of clusters that are identified and ranked based on the executed cluster identification operation. Further, one or more service management operations may be presented as product recommendations in association with one or more of the identified and ranked clusters to the user as shown in the GUI 700 of FIG. 7.

Figure 7:
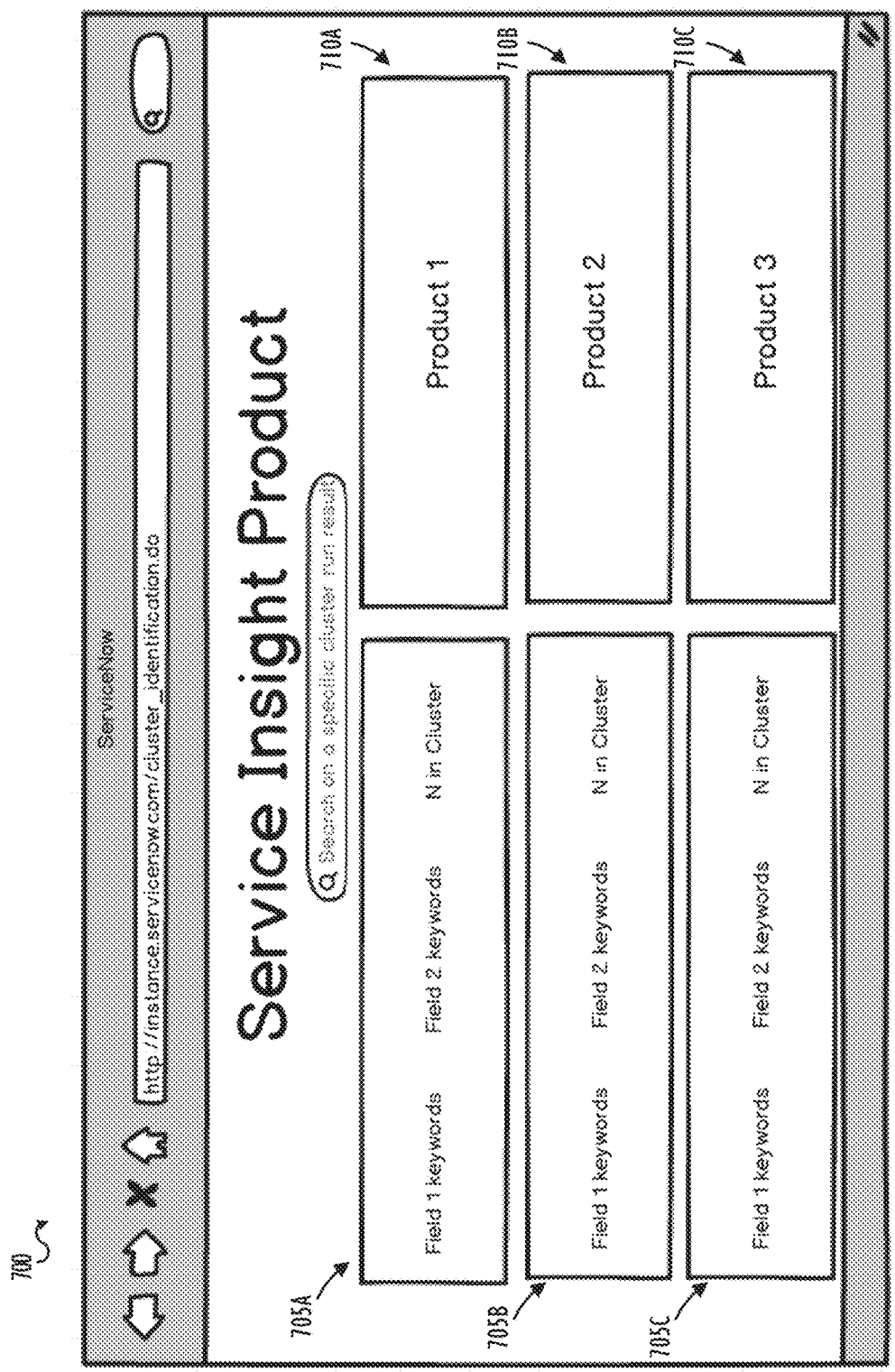
FIG. 7 shows a screen shot of a GUI 700 in accordance with one or more embodiments.

GUI 700 of FIG. 7 may include an interactive screen to present to a user service management operations that are identified in association with one or more of the ranked clusters by executing the program of the computing system performing one or more of the operations described in FIG. 3. As shown in GUI 700, output fields 705A-705C are presented in respective association with output fields 710A-710C. Each output field 705A-705C corresponds to one of the identified and ranked clusters presented to the user in the report 500A-500B shown in FIGS. 5A-5B. A text phrase generated based on the first target field (e.g., short description field) of the cluster, a text phrase generated based on the second target field (e.g., work notes or close notes field) of the cluster, and a number of incident reports that belong to the cluster may be presented for each output field 705A-705C. Each output field 710A-710C corresponds to a product or service that may be recommended to address the type of issue that is presented by the corresponding cluster in output fields 705A-705C.

In one embodiment, the computing system automatically identifies service management operations that may be recommended to address the type of issues presented by the corresponding top ranked clusters. Since the computing system ranks the plurality of clusters based on the number of incident reports included in the cluster and the quality of the cluster relative to both the first and second target fields, the computing system identifies the most important clusters that will deliver the highest return on investment if service management operations are implemented in association with those clusters. Further, since the quality of the clustering is known, the computing system may be able to determine with a high degree of confidence what the type of issue is (first target field) for a given cluster and what the resolution or result (second target field) of that issue may look like.

Further, the computing system may be able to determine whether or not the issue/resolution pair of the cluster is of a type that may be addressed using a given service management product, and if it is, then the computing system may make a recommendation to implement the service management product corresponding to the cluster. For example, referring to the sample report shown in FIG. 5A, the computing system may determine that the "Password Reset" cluster and the "AD Account Locked" cluster together represent a significant percentage of the total incidents of the client instance. Further, the computing system may determine that the "Password Reset" cluster and the "AD Account Locked" cluster are types of clusters for which service management operations may be implemented. Therefore, the computing system may identify the "Password Reset" cluster and the "AD Account Locked" cluster and recommend certain service management product(s) that may be implemented to address the types of issues suggested by the identified clusters. By implementing the recommended service management product(s), as shown in the example report of FIG. 5A, 2.8% of the total number of incidents may be prevented from occurring in the first place, thereby resulting in significant savings of time and cost for the client.

A service management operation (or product) may be a virtual agent onboarding product that helps identify the job responsibilities of a virtual agent, and enable faster implementation of the virtual agent. The cluster identification operation helps identify and fine tune the dataset of clusters from which candidate conversations may be identified. Candidate conversations are the type of 'Query—Resolution' pairs that can be deflected to a virtual agent for automated resolution. Conversation trees may be created and intent—response pairs may be defined based on the text of the first and second target fields of the identified cluster. The volume of the clusters help prioritize which conversation trees should be created. The conversation trees corresponding to the identified clusters may be automatically generated for the virtual agent implementation. A user of client instance 208 having an issue of the type that is associated with the cluster for which a virtual agent has been implemented may then be able to chat with the virtual agent capable of having an intelligent conversation based on conversation trees defining intent-response pairs to resolve the issue, get resolution data or kickoff workflow from the backend and resolve the issue without having to create incident reports. The virtual agent may use prebuilt conversation trees (built based on the underlying cluster information and for example, the text of the first and second target fields) to assist the user in resolving the issue, thereby providing self-service resolution for expedited time to value. The virtual agent may also be able to perform tasks such as incident creation, approvals, knowledge base search, check status and intelligent live agent contextual handoff if the virtual agent is unable to resolve the user's issue or if the user requests the virtual agent to perform such additional tasks. Another service management product may be a workflow product recommending the creation and implementation of a workflow to automate resolution of the type of issue that is presented by an identified cluster. Future incidents of the type may then be handled by the workflow thereby reducing the total number of incidents that are created in the client instance. After identifying high volume issues, the computing system may recommend creation of issue-specific templates, and may use resolution clusters for the issues to glean insight into the template text and field values. For example, a template could contain a short description of "VPN connection issues," with an additional comment of: "Have you tried connecting to the corporate network prior to connecting to the VPN?" This may be a question and answer pair that live agents can use as a "first call" deflection response.

Another service management product may be a knowledge management product that recommends the user of the client instance to create and implement knowledge articles for self-service resolution of the type of issue that is presented by an identified cluster. Client instance 208 may then attempt to resolve future incidents of the type by presenting the user of the client instance with the implemented knowledge articles so that the user may attempt to address the issue through self-service. This may also lead to reduction in the total number of incidents created in the client instance that may need to be handled by live agents. Another service management product may be a problem management product that recommends the user of client instance 208 to perform a root-cause analysis corresponding to an identified cluster. When multiple attempts to solve problem are made over time but the problem keeps recurring, it may indicate that the right fix was not implemented to begin with. This may indicate the need for problem management to identify the source where the problem is stemming from for an identified cluster.

In one embodiment, information (such as information of the identified and ranked clusters in report 500A-500B shown in FIGS. 5A-5B) generated by the cluster identification operation of FIG. 3 may be used by a benchmark recommendation engine of client instance 208 to provide personalized and client instance specific service management product recommendations in association with a key performance indicator (KPI) related to the client instance. More specifically, the recommendation engine may use the information generated by the cluster identification operation to show the user how the recommended service management product will improve a score of a related KPI as compared to an industry benchmark score. For example, in case of the sample report of FIG. 5A, in association with a related KPI, the recommendation engine may recommend the virtual agent product for the "Password Reset" cluster and the "AD Account Locked" cluster by pointing out that 2.8% of the total number of incidents may be prevented from occurring in the first place if the recommended virtual agent product were implemented. Users of the client instance may be unaware of which service management products are needed. By giving product recommendations based on client instance specific data, the computing system can contextually indicate what issues a product would revolve, and increase client success.

Figure 8:
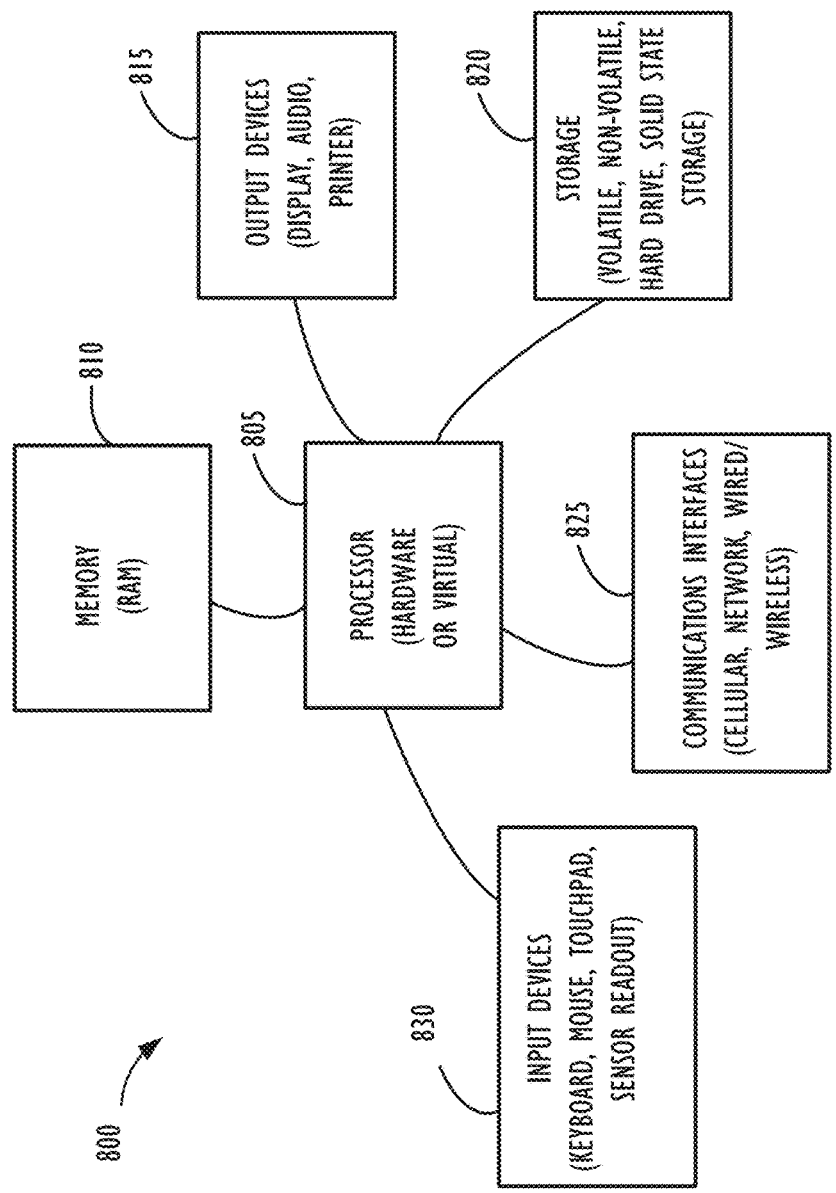
FIG. 8 illustrates a high-level block diagram 800 of a processing device (computing system) that may be used to implement one or more disclosed embodiments.

FIG. 8 illustrates a high-level block diagram 800 of a processing device (computing system) that may be used to implement one or more disclosed embodiments (e.g., service provider cloud infrastructure 110, client devices 104A-104E, server instances 114, data centers 206A-206B, etc.). For example, computing device 800 illustrated in FIG. 8 could represent a client device or a physical server device and include either hardware or virtual processor(s) depending on the level of abstraction of the computing device. In some instances (without abstraction) computing device 800 and its elements as shown in FIG. 8 each relate to physical hardware and in some instances one, more, or all of the elements could be implemented using emulators or virtual machines as levels of abstraction. In any case, no matter how many levels of abstraction away from the physical hardware, computing device 800 at its lowest level may be implemented on physical hardware. As also shown in FIG. 8, computing device 800 may include one or more input devices 830, such as a keyboard, mouse, touchpad, or sensor readout (e.g., biometric scanner) and one or more output devices 815, such as displays, speakers for audio, or printers. Some devices may be configured as input/output devices also (e.g., a network interface or touchscreen display). Computing device 800 may also include communications interfaces 825, such as a network communication unit that could include a wired communication component and/or a wireless communications component, which may be communicatively coupled to processor 805. The network communication unit may utilize any of a variety of proprietary or standardized network protocols, such as Ethernet, TCP/IP, to name a few of many protocols, to effect communications between devices. Network communication units may also comprise one or more transceivers that utilize the Ethernet, power line communication (PLC), Wi-Fi, cellular, and/or other communication methods.

As illustrated in FIG. 8, processing device 800 includes a processing element such as processor 805 that contains one or more hardware processors, where each hardware processor may have a single or multiple processor cores. In one embodiment, the processor 805 may include at least one shared cache that stores data (e.g., computing instructions) that are utilized by one or more other components of processor 805. For example, the shared cache may be a locally cached data stored in a memory for faster access by components of the processing elements that make up processor 805. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) a microprocessor. Although not illustrated in FIG. 8, the processing elements that make up processor 805 may also include one or more other types of hardware processing components, such as graphics processing units (GPUs), application specific integrated circuits (ASICs), field-programmable gate arrays (FPGAs), and/or digital signal processors (DSPs).

FIG. 8 illustrates that memory 810 may be operatively and communicatively coupled to processor 805. Memory 810 may be a non-transitory medium configured to store various types of data. For example, memory 810 may include one or more storage devices 820 that comprise a non-volatile storage device and/or volatile memory. Volatile memory, such as random access memory (RAM), can be any suitable non-permanent storage device. The non-volatile storage devices 820 can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage devices 820 may be used to store overflow data if allocated RAM is not large enough to hold all working data. The non-volatile storage devices 820 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 805. In one embodiment, the compiling process of the software program may transform program code written in a programming language to another computer language such that the processor 805 is able to execute the programming code. For example, the compiling process of the software program may generate an executable program that provides encoded instructions (e.g., machine code instructions) for processor 805 to accomplish specific, non-generic, particular computing functions.

After the compiling process, the encoded instructions may then be loaded as computer executable instructions or process steps to processor 805 from storage 820, from memory 810, and/or embedded within processor 805 (e.g., via a cache or on-board ROM). Processor 805 may be configured to execute the stored instructions or process steps in order to perform instructions or process steps to transform the computing device into a non-generic, particular, specially programmed machine or apparatus. Stored data, e.g., data stored by a storage device 820, may be accessed by processor 805 during the execution of computer executable instructions or process steps to instruct one or more components within the computing device 800.

A user interface (e.g., output devices 815 and input devices 830) can include a display, positional input device (such as a mouse, touchpad, touchscreen, or the like), keyboard, or other forms of user input and output devices. The user interface components may be communicatively coupled to processor 805. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 800 may comprise other components well known in the art, such as sensors, powers sources, and/or analog-to-digital converters, not explicitly shown in FIG. 8.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). The use of the term "about" means ±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. A cluster identification system for service management operations, comprising:
   a non-transitory memory; and
   one or more hardware processors configured to execute instructions from the non-transitory memory to:
   obtain client instance data including a plurality of incidents, each incident including a plurality of fields;
   select a first target field and an evaluation field from among the plurality of fields;
   group the plurality of incidents of the client instance data into a plurality of clusters based on a degree of a first natural language text similarity of respective first target fields in the plurality of incidents;
   determine, for each of the plurality of clusters, a first quality value based on the degree of the first natural language text similarity of respective first target fields in grouped incidents of the cluster from among the plurality of incidents, and based on respective evaluation fields in the grouped incidents of the cluster;
   select a second target field from among the plurality of fields, the second target field being different from the first target field;
   determine, for each of the plurality of clusters, a second quality value based on a degree of a second natural language text similarity of respective second target fields in the grouped incidents of the cluster from among the plurality of incidents, and based on the respective evaluation fields in the grouped incidents of the cluster;
   rank each of the plurality of clusters of the client instance data based on the respective first quality value and the respective second quality value of the cluster and a respective number of the grouped incidents of the cluster of the client instance data;
   receive client instance data associated with a new incident; and
   automatically resolve the new incident with a virtual agent associated with at least one of the ranked plurality of clusters.

2. The cluster identification system according to claim 1, wherein:
   the first target field is an incident short description text field;
   the second target field is an incident resolution detail text field or an incident comments and work notes or close notes text field; and
   the evaluation field is a validation field including an incident category or an incident assignment group.

3. The cluster identification system according to claim 1, wherein the degree of the second natural language text similarity of the respective second target fields in the grouped incidents of the cluster is determined by:
   breaking down a natural language text of the respective second target fields in the grouped incidents of the cluster into single words or one or more contiguous sequences of plural words; and
   determining the degree of the second natural language text similarity based on a comparison of the broken down natural language text across the respective second target fields in the grouped incidents of the cluster.

4. The cluster identification system according to claim 1, wherein the one or more hardware processors are further configured to execute instructions to:
   display a ranked list of the plurality of clusters by displaying, for each cluster, a description of the respective first and second target fields and the respective number of the grouped incidents included in the cluster; and
   display a pareto chart that is associated with the description of the respective first target fields of the plurality of clusters and that is based on the respective number of the grouped incidents included in the plurality of clusters.

5. The cluster identification system according to claim 1, wherein the grouping of the plurality of incidents into the plurality of clusters comprises applying a data clustering algorithm to the obtained client instance data to group the plurality of incidents into the plurality of clusters.

6. A non-transitory computer-readable recording medium having stored thereon a program for a computer of a cluster identification system for service management operations, the program comprising instructions that when executed, cause the computer to:
   obtain client instance data including a plurality of incidents, each incident including a plurality of fields;
   select a first target field and an evaluation field from among the plurality of fields;
   group the plurality of incidents of the client instance data into a plurality of clusters based on a degree of a first natural language text similarity of respective first target fields in the plurality of incidents;
   determine, for each of the plurality of clusters, a first quality value based on the degree of the first natural language text similarity of respective first target fields in grouped incidents of the cluster from among the plurality of incidents, and based on respective evaluation fields in the grouped incidents of the cluster;
   select a second target field from among the plurality of fields, the second target field being different from the first target field;
   determine, for each of the plurality of clusters, a second quality value based on a degree of a second natural language text similarity of respective second target fields in the grouped incidents of the cluster from among the plurality of incidents, and based on the respective evaluation fields in the grouped incidents of the cluster;
   rank each of the plurality of clusters of the client instance data based on the respective first quality value and the respective second quality value of the cluster and a respective number of the grouped incidents of the cluster of the client instance data;
   receive client instance data associated with a new incident; and
   automatically resolve the new incident with a virtual agent associated with at least one of the ranked plurality of clusters.

7. The computer-readable recording medium according to claim 6, wherein:
   the first target field is an incident short description text field;
   the second target field is an incident resolution detail text field or an incident comments and work notes or close notes text field; and
   the evaluation field is a validation field including an incident category or an incident assignment group.

8. The computer-readable recording medium according to claim 6, wherein the degree of the second natural language text similarity of the respective second target fields in the grouped incidents of the cluster is determined by:

breaking down a natural language text of the respective second target fields in the grouped incidents of the cluster into single words or one or more contiguous sequences of plural words; and determining the degree of the second natural language text similarity based on a comparison of the broken down natural language text across the respective second target fields in the grouped incidents of the cluster.

9. The computer-readable recording medium according to claim 6, wherein the program further includes instructions that when executed, cause the computer to:

display a ranked list of the plurality of clusters by displaying, for each cluster, a description of the respective first and second target fields and the respective number of the grouped incidents included in the cluster; and display a pareto chart that is associated with the respective first target fields of the plurality of clusters and that is based on the respective number of the grouped incidents included in the ranked clusters.

10. A cluster identification method for service management operations, comprising:

obtaining, by one or more hardware processors, client instance data including a plurality of incidents, each incident including a plurality of fields;

selecting, by the one or more hardware processors, a first target field and an evaluation field from among the plurality of fields;

grouping, by the one or more hardware processors, the plurality of incidents of the client instance data into a plurality of clusters based on a degree of a first natural language text similarity of respective first target fields in the plurality of incidents;

determining, by the one or more hardware processors and for each of the plurality of clusters, a first quality value based on the degree of the first natural language text similarity of respective first target fields in grouped incidents of the cluster from among the plurality of incidents, and based on respective evaluation fields in the grouped incidents of the cluster;

selecting, by the one or more hardware processors, a second target field from among the plurality of fields, the second target field being different from the first target field;

determining, by the one or more hardware processors and for each of the plurality of clusters, a second quality value based on a degree of a second natural language text similarity of respective second target fields in the grouped incidents of the cluster from among the plurality of incidents, and based on the respective evaluation fields in the grouped incidents of the cluster;

ranking, by the one or more hardware processors, each of the plurality of clusters of the client instance data based on the respective first and the respective second quality value of the cluster and a respective number of the grouped incidents of the cluster of the client instance data;

receiving, by the one or more hardware processors, client instance data associated with the new incident; and automatically resolving the new incident with a virtual agent associated with at least one of the ranked plurality of clusters.

11. The cluster identification method according to claim 10, wherein:

the first target field is an incident short description text field;

the second target field is an incident resolution detail text field or an incident comments and work notes or close notes text field; and the evaluation field is a validation field including an incident category or an incident assignment group.

* * * * *